(12) United States Patent
Li et al.

(10) Patent No.: US 10,540,573 B1
(45) Date of Patent: Jan. 21, 2020

(54) STORY CYCLE TIME ANOMALY PREDICTION AND ROOT CAUSE IDENTIFICATION IN AN AGILE DEVELOPMENT ENVIRONMENT

(71) Applicant: FMR LLC, Boston, MA (US)

(72) Inventors: Pu Li, Auburndale, MA (US); Liang Chen, Dalian (CN); XiaoJia Yang, Dalian (CN); Zanyu Xie, Dalian (CN); Yulong Zhang, Dalian (CN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/211,968

(22) Filed: Dec. 6, 2018

(51) Int. Cl.
| | |
|---|---|
| G06F 9/44 | (2018.01) |
| G06K 9/62 | (2006.01) |
| G06N 3/08 | (2006.01) |
| G06F 11/36 | (2006.01) |
| G06N 5/00 | (2006.01) |
| G06N 20/00 | (2019.01) |

(52) U.S. Cl.
CPC ........ G06K 9/6262 (2013.01); G06F 11/3688 (2013.01); G06K 9/6261 (2013.01); G06N 3/08 (2013.01); G06N 5/00 (2013.01); G06N 20/00 (2019.01)

(58) Field of Classification Search
CPC ........ G06N 20/00; G06N 5/00; G06F 16/353; G06F 8/71; G06F 8/72; H04L 41/16; G06Q 30/06; G06K 9/6262; G06K 9/6261
See application file for complete search history.

(56) References Cited

U.S. PATENT DOCUMENTS

| | | | |
|---|---|---|---|
| 9,619,208 B2 | 4/2017 | Davidov et al. | |
| 2003/0130899 A1* | 7/2003 | Ferguson | G06Q 30/06 705/26.1 |
| 2010/0299650 A1 | 11/2010 | Abrahamsen et al. | |
| 2014/0172514 A1 | 6/2014 | Schumann et al. | |
| 2015/0121332 A1 | 4/2015 | Bhattacharyya et al. | |
| 2016/0162779 A1* | 6/2016 | Marcus | G06N 20/00 706/12 |
| 2016/0274995 A1 | 9/2016 | Klein | |
| 2017/0161063 A1 | 6/2017 | Bishop | |
| 2017/0177627 A1* | 6/2017 | Singh | G06F 16/353 |
| 2017/0185931 A1 | 6/2017 | Bhojan | |
| 2018/0150758 A1* | 5/2018 | Niininen | H04L 41/16 |
| 2019/0019108 A1* | 1/2019 | Eads | G06N 20/00 |
| 2019/0026106 A1* | 1/2019 | Burton | G06F 8/71 |

* cited by examiner

*Primary Examiner* — Tuan A Vu
(74) *Attorney, Agent, or Firm* — Proskauer Rose LLP (57) ABSTRACT

Methods and apparatuses are described for automated computer text classification and routing using artificial intelligence transfer learning. A server captures historical story data from an Agile development tracking system. For each completed story, the server generates a vector based upon story-specific features and assigns a label to the vector based upon a cycle time associated with the story. The server trains a classification model using a neural network on the vectors and labels. The server captures new story data from the Agile development tracking system. For each new story, the server generates a vector based upon story-specific features and executes the trained model on the vector to generate a cycle time prediction for the new story. Based upon the cycle time prediction, the server identifies deficiencies in the new story and generates an alert message.

28 Claims, 5 Drawing Sheets

STORY CYCLE TIME ANOMALY PREDICTION AND ROOT CAUSE IDENTIFICATION IN AN AGILE DEVELOPMENT ENVIRONMENT

TECHNICAL FIELD

This application relates generally to methods and apparatuses, including computer program products, for story cycle time anomaly prediction and root cause identification in an Agile development environment.

BACKGROUND

Recently, machine learning and artificial intelligence have seen a rise in prominence in a variety of different fields and for a number of specific applications, largely due to advances in computing technology that enables the implementation of advanced algorithms and techniques. One such area is software development project management, which relates to creating and managing a development timeline, and coordinating appropriate resources (e.g., assigning software developers to specific tasks), that result in completion of a software development project. One approach to project management is the use of an Agile development framework. Agile is characterized by the utilization of quick, efficient development periods (called sprints), at the end of which one or more deliverables are created and then further sprints are adapted in response to changing development needs and objectives.

Generally, Agile development provides that a project can be organized into one or more segments with each segment being broken down into a plurality of 'stories'—each story defining a particular piece of functionality in the segment. Stories typically include a description of the required functionality, acceptance criteria, story points (i.e., estimation of effort), start time, end time, creator, assignee (i.e., developer(s) that will work on the story), and so forth. The difference between the start time and the end time of the story is understood as the cycle time—that is, the total elapsed time including process time (during which a unit of work is acted upon to bring the story closer to an output) and delay time (during which a unit of work is used waiting to take the next action). Each story can be further partitioned into tasks. Typically, each sprint involves a developer or a team of developers conducting a full development cycle including planning, designing, coding, and quality assurance/testing phases.

To aid managers, producers, and developers, project management software packages have been used to organize, guide, and document the software development process more efficiently and effectively. Such software packages are available to track the Agile development process—examples include the JIRA™ issue/project tracking tool available from Atlassian, Agilean™ available from Agilean, and Planbox™ available from Planbox Inc. Such project management software packages typically track cycle time of stories and can provide certain user interfaces to help developers and managers visualize cycle time.

However, these packages do not have the capability to automatically analyze cycle time of completed stories in order to provide a cycle time prediction for newly-entered stories—so that developers can assess the impact of new stories on the development timeline and adjust the timeline as necessary to be more efficient. In addition, these existing packages do not automatically determine a root cause of certain cycle time anomalies for new stories that are entered so that developers can seamlessly change or remove specific stories from a sprint to avoid potential development issues or bottlenecks.

SUMMARY

Therefore, what is needed are methods and systems that utilize a corpus of historical Agile story data to conduct advanced machine learning processing that enables the project management tracking system to automatically determine a probable cycle time for new Agile stories as they are entered, and to analyze new Agile stories that exhibit an anomalous cycle time prediction for errors or issues that may be causing the cycle time anomaly. The systems and methods described herein advantageously leverage the automatic, self-learning capabilities of artificial intelligence computing techniques in the context of Agile software development to quickly and efficiently classify new Agile stories as predicted to result in an anomalous (e.g., higher-than-expected) cycle time and immediately analyze the specific characteristics (e.g., assignee, description, summary, story points, etc.) of such new stories to deduce one or more root causes of the predicted cycle time—so that the system can then reassess the stories as needed and instruct a software development tracking system to change the stories that could impact the development timeline.

The invention, in one aspect, features a system for story cycle time anomaly root cause identification and prediction in an Agile development environment. The system comprises a server computing device including a memory that stores computer-executable instructions and a processor that executes the computer-executable instructions. The server computing device captures historical data for each of a plurality of completed stories in an Agile development tracking system, the historical data including a plurality of features associated with the completed story. For each completed story, the server computing device determines one or more developer-specific features from the plurality of features associated with the completed story. The server computing device converts the developer-specific features associated with the completed story into a first vector. The server computing device determines a text summary for the completed story and a text description for the completed story from the plurality of features. The server computing device identifies a length and a word count for each of the text summary and the text description for the completed story. The server computing device converts the text summary for the completed story into a second vector. The server computing device converts the text description for the completed story into a third vector. The server computing device combines the first vector, the second vector, the third vector, the length for the completed story, and the word count for the completed story into a combined vector for the completed story. The server computing device assigns a label to the combined vector for the completed story, the label based upon a cycle time associated with the completed story. The server computing device trains, using an artificial intelligence neural network executing on the server computing device, a classification model using the combined vectors and the labels for the completed stories. The server computing device captures current data for each of a plurality of new stories in the Agile development tracking system, the current data including a plurality of features associated with the new story. For each new story, the server computing device determines one or more developer-specific features from the plurality of features associated with the new story. The server computing device converts the developer-specific features associated with the new story into a fourth vector. The server computing device determines a text summary for the new story and a text description for the new story from the plurality of features. The server computing device identifies a length and a word count for each of the text summary and the text description for the new story. The server computing device converts the text summary for the new story into a fifth vector. The server computing device converts the text description for the new story into a sixth vector. The server computing device combines the fourth vector, the fifth vector, the sixth vector, the length for the new story, and the word count for the new story into a combined vector for the new story. The server computing device executes the trained classification model using the combined vector for each new story as input to generate a cycle time prediction for the new story. Based upon the cycle time prediction generated by the trained classification model, the server computing device identifies one or more deficiencies in the plurality of features for the new story. The server computing device generates an alert message to be displayed in a user interface on a client computing device, the alert message comprising the identified deficiencies arranged in the user interface in proximity to the corresponding features for each new story.

The invention, in another aspect, features a computerized method of story cycle time anomaly root cause identification and prediction in an Agile development environment. A server computing device captures historical data for each of a plurality of completed stories in an Agile development tracking system, the historical data including a plurality of features associated with the completed story. For each completed story, the server computing device determines one or more developer-specific features from the plurality of features associated with the completed story. The server computing device converts the developer-specific features associated with the completed story into a first vector. The server computing device determines a text summary for the completed story and a text description for the completed story from the plurality of features. The server computing device identifies a length and a word count for each of the text summary and the text description for the completed story. The server computing device converts the text summary for the completed story into a second vector. The server computing device converts the text description for the completed story into a third vector. The server computing device combines the first vector, the second vector, the third vector, the length for the completed story, and the word count for the completed story into a combined vector for the completed story. The server computing device assigns a label to the combined vector for the completed story, the label based upon a cycle time associated with the completed story. The server computing device trains, using an artificial intelligence neural network executing on the server computing device, a classification model using the combined vectors and the labels for the completed stories. The server computing device captures current data for each of a plurality of new stories in the Agile development tracking system, the current data including a plurality of features associated with the new story. For each new story, the server computing device determines one or more developer-specific features from the plurality of features associated with the new story. The server computing device converts the developer-specific features associated with the new story into a fourth vector. The server computing device determines a text summary for the new story and a text description for the new story from the plurality of features. The server computing device identifies a length and a word count for each of the text summary and the text description for the new story. The server computing device converts the text summary for the new story into a fifth vector. The server computing device converts the text description for the new story into a sixth vector. The server computing device combines the fourth vector, the fifth vector, the sixth vector, the length for the new story, and the word count for the new story into a combined vector for the new story. The server computing device executes the trained classification model using the combined vector for each new story as input to generate a cycle time prediction for the new story. Based upon the cycle time prediction generated by the trained classification model, the server computing device identifies one or more deficiencies in the plurality of features for the new story. The server computing device generates an alert message to be displayed in a user interface on a client computing device, the alert message comprising the identified deficiencies arranged in the user interface in proximity to the corresponding features for each new story.

Any of the above aspects can include one or more of the following elements. In some embodiments, the plurality of features associated with the completed story comprise project name, project ID, team name, issue ID, issue type, issue type name, story points, size estimate, parent issue ID, reporter, assignee, summary, description, and cycle time. In some embodiments, cycle time comprises an amount of time needed to complete the story. In some embodiments, the developer-specific features comprise team name, story points, reporter, and assignee. In some embodiments, the developer-specific features are converted into the first vector using a one-hot encoder.

In some embodiments, the text summary for the completed story is converted into the second vector using one or more of: a bag-of-words model or a term frequency-inverse document frequency (TF-IDF) technique. In some embodiments, the text description for the completed story is converted into the third vector using one or more of: a bag-of-words model or a term frequency-inverse document frequency (TF-IDF) technique. In some embodiments, the label assigned to the combined vector for the completed story indicates a high cycle time when the cycle time for the completed story is above a predetermined threshold. In some embodiments, the label assigned to the combined vector for the completed story indicates a normal cycle time when the cycle time for the completed story is at or below a predetermined threshold.

In some embodiments, the plurality of features associated with the new story comprise project name, project ID, team name, issue ID, issue type, issue type name, story points, size estimate, parent issue ID, reporter, assignee, summary, description, and cycle time. In some embodiments, the developer-specific features are converted into the fourth vector using a one-hot encoder. In some embodiments, the text summary for the new story is converted into the fifth vector using one or more of: a bag-of-words model or a term frequency-inverse document frequency (TF-IDF) technique. In some embodiments, the text description for the new story is converted into the sixth vector using one or more of: a bag-of-words model or a term frequency-inverse document frequency (TF-IDF) technique. In some embodiments, the one or more deficiencies comprise data errors in the plurality of features.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
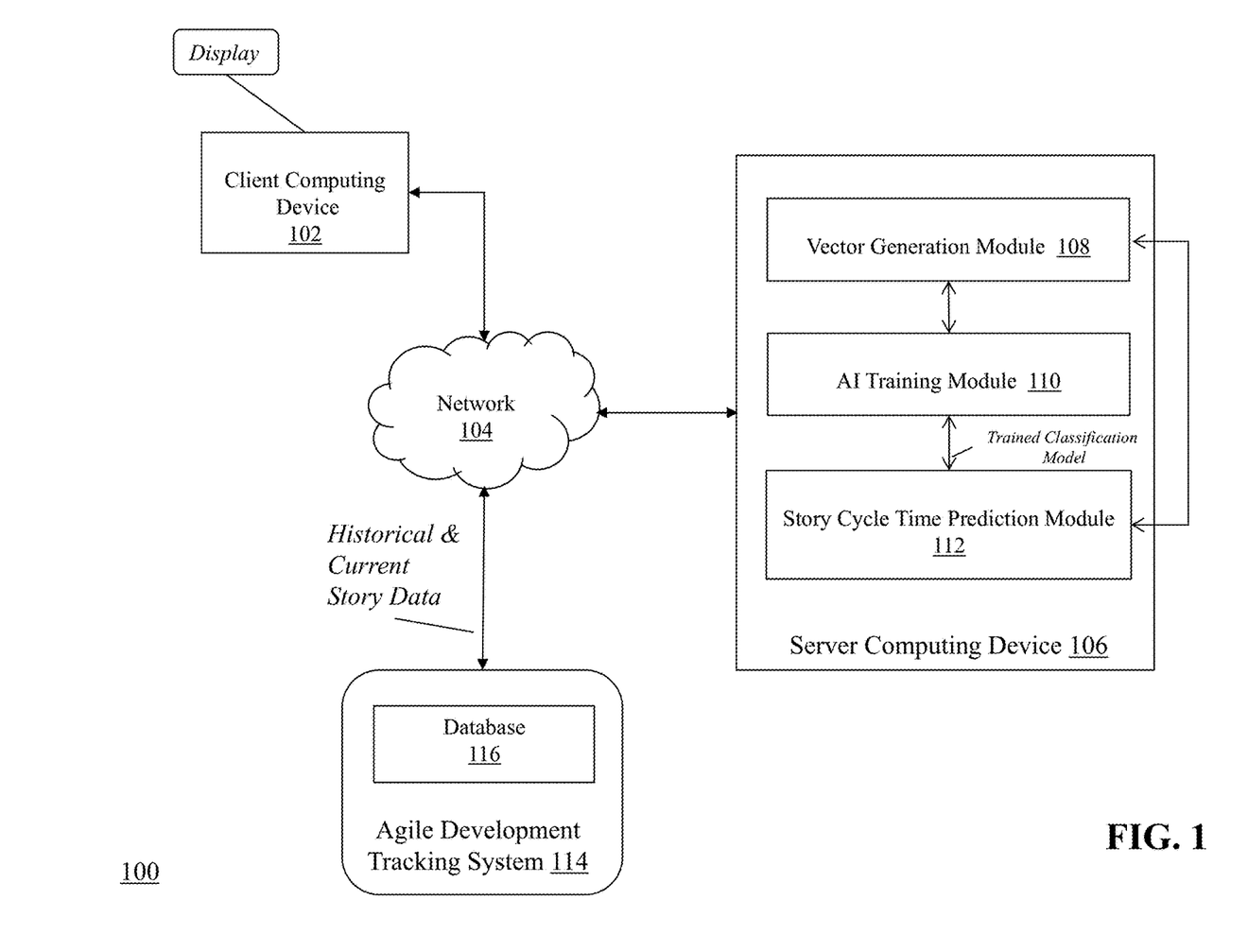
FIG. 1 is a block diagram of a system for story cycle time anomaly root cause identification and prediction in an Agile development environment using artificial intelligence machine learning techniques.

FIG. 1 is a block diagram of a system 100 for story cycle time anomaly root cause identification and prediction in an Agile development environment using artificial intelligence machine learning techniques. The system 100 includes a client computing device 102, a communications network 104, a server computing device 106 that includes a vector generation module 108, an artificial intelligence (AI) training module 110, and a story cycle time prediction module 112, and an Agile development tracking computing system 114 coupled to the network 104 that includes a database 116 for storing, e.g., historical and current story data for one or more Agile software projects.

The client computing device 102 connects to the communications network 104 in order to communicate with the server computing device 106 to provide input and receive output relating to the process of story cycle time anomaly root cause identification and prediction in an Agile development environment as described herein. The client computing device 102 is coupled to a display device (e.g., a monitor or screen). For example, client computing device 102 can provide a graphical user interface (GUI) via the display device that presents output resulting from the methods and systems described herein.

Exemplary client computing devices 102 include but are not limited to desktop computers, laptop computers, tablets, mobile devices, smartphones, and internet appliances. It should be appreciated that other types of computing devices that are capable of connecting to the components of the system 100 can be used without departing from the scope of invention. Although FIG. 1 depicts a single client computing device 102, it should be appreciated that the system 100 can include any number of client computing devices.

The communications network 104 enables the client computing device 102 to communicate with the server computing device 106. The network 104 is typically a wide area network, such as the Internet and/or a cellular network. In some embodiments, the network 104 is comprised of several discrete networks and/or sub-networks (e.g., cellular to Internet).

The server computing device 106 is a device including specialized hardware and/or software modules that execute on a processor and interact with memory modules of the server computing device 106, to receive data from other components of the system 100, transmit data to other components of the system 100, and perform functions for story cycle time anomaly root cause identification and prediction in an Agile development environment as described herein. The server computing device 106 includes several computing modules 108, 110, 112 that execute on the processor of the server computing device 106. In some embodiments, the modules 108, 110, 112 are specialized sets of computer software instructions programmed onto one or more dedicated processors in the server computing device 106 and can include specifically-designated memory locations and/or registers for executing the specialized computer software instructions.

Although the modules 108, 110, 112 are shown in FIG. 1 as executing within the same server computing device 106, in some embodiments the functionality of the modules 108, 110, 112 can be distributed among a plurality of server computing devices. As shown in FIG. 1, the server computing device 106 enables the modules 108, 110, 112 to communicate with each other in order to exchange data for the purpose of performing the described functions. It should be appreciated that any number of computing devices, arranged in a variety of architectures, resources, and configurations (e.g., cluster computing, virtual computing, cloud computing) can be used without departing from the scope of the invention. The exemplary functionality of the modules 108, 110, 112 is described in detail below.

The Agile development tracking system 114 is a computing device (or in some embodiments, a set of computing devices) coupled to the server computing device 106 and is configured to receive, generate, and store specific segments of data relating to the process of story cycle time anomaly root cause identification and prediction in an Agile development environment as described herein. In some embodiments, the Agile development tracking system 114 is a JIRA™-based computing platform that enables developers to enter, save, update, and remove, e.g., Agile stories, tasks, and the like (via a user interface provided by client computing device 102) for one or more ongoing software development projects. The Agile development tracking system 114 includes a database 116 for storing the Agile story data, among other things, including both historical story data and current (or newly-entered but not yet saved) story data. In some embodiments, all or a portion of the database 116 can be integrated with the Agile development tracking system 114 or be located on a separate computing device or devices. The database 116 can comprise one or more databases configured to store portions of data used by the other components of the system 100, as will be described in greater detail below. An exemplary database 116 is MySQL™ available from Oracle Corp. of Redwood City, Calif.

Figure 2A:
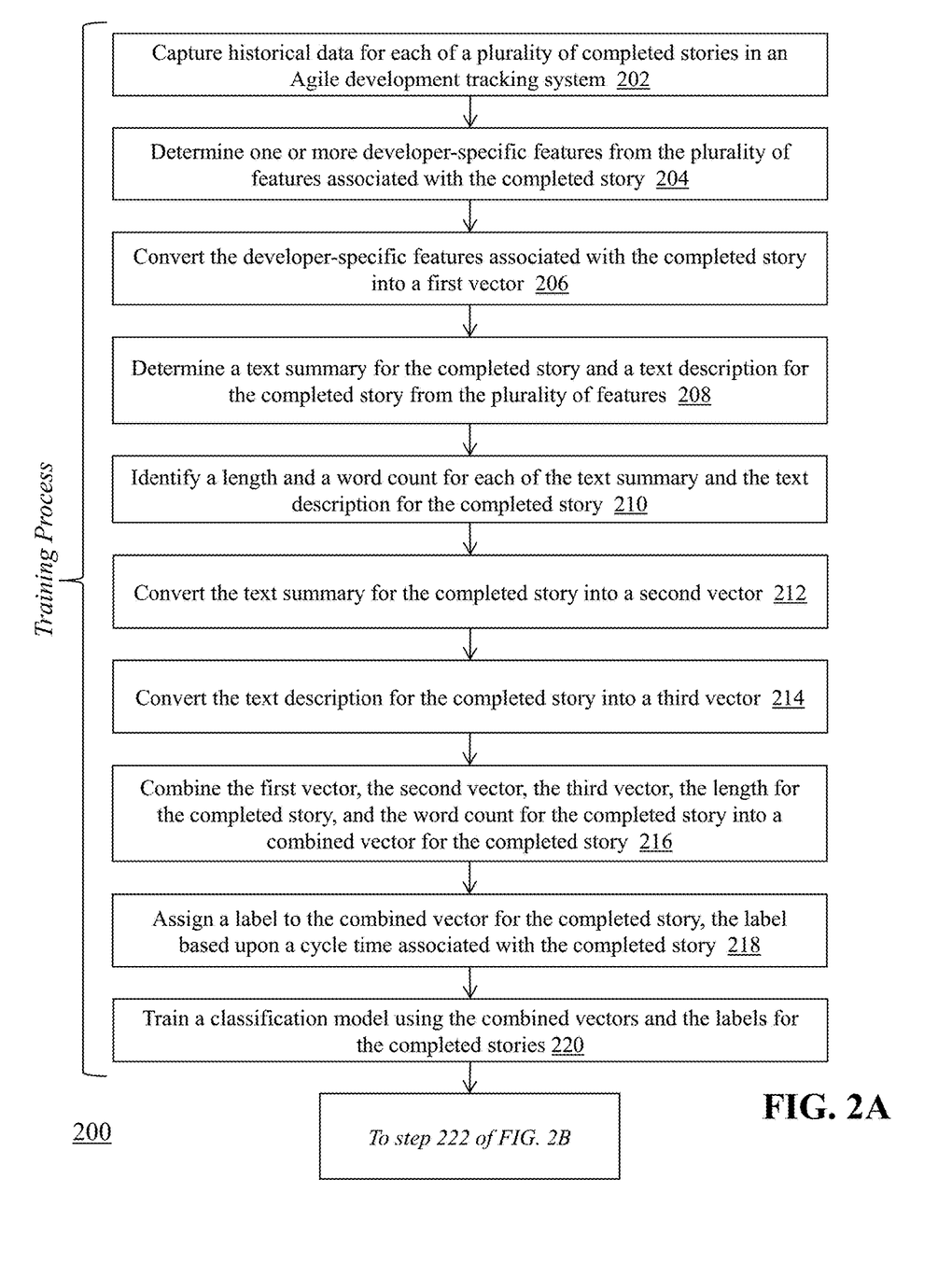
FIGS. 2A, 2B, and 2C comprise a flow diagram of a computerized method of story cycle time anomaly root cause identification and prediction in an Agile development environment using artificial intelligence machine learning techniques.
Figure 2B:
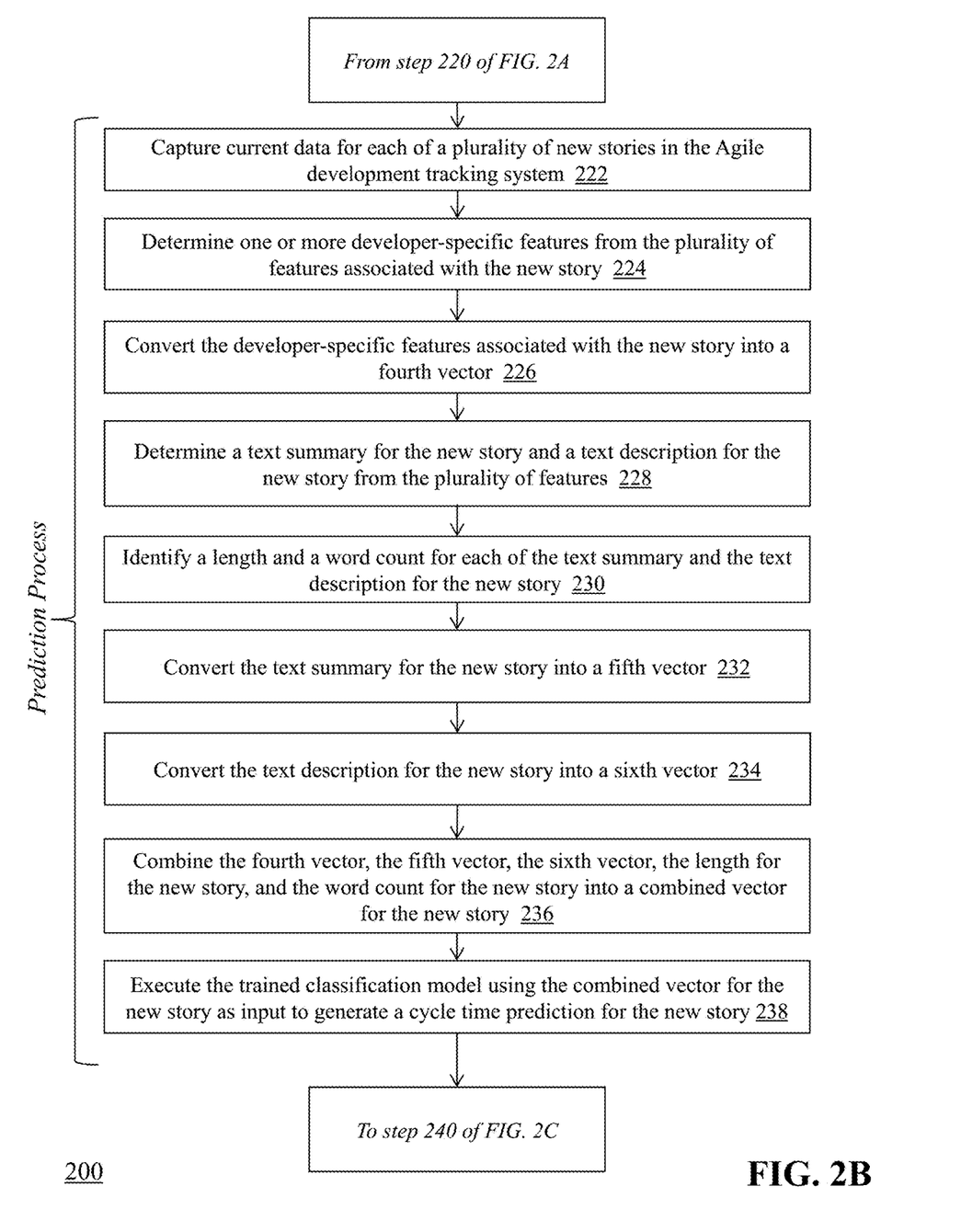
Figure 2C:
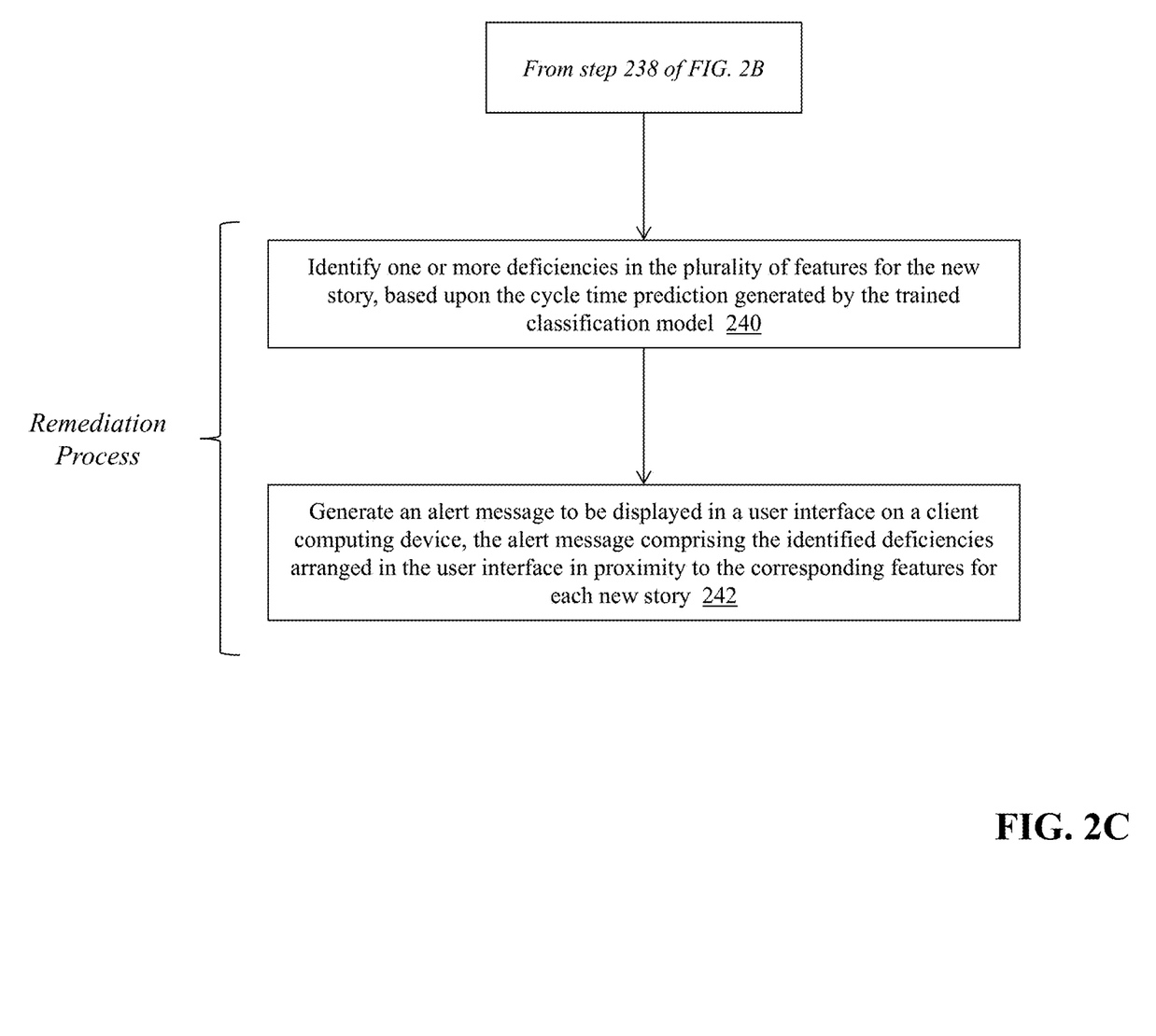

FIGS. 2A, 2B, and 2C comprise a flow diagram of a computerized method 200 of story cycle time anomaly root cause identification and prediction in an Agile development environment using artificial intelligence machine learning techniques, using the system 100 of FIG. 1. The first phase of the method 200 comprises a training process (i.e. steps 202-220 in FIG. 2A), whereby modules of the server computing device 106 receive historical and current story data from the Agile development tracking system 114, and analyze and prepare the historical story data for generation and training of neural network-based classification model(s). Then, in a second phase of the method 200, modules of the server computing device 106 subsequently execute the trained classification model(s) using current/newly-entered story data as input to a prediction process (i.e. steps 222-238 in FIG. 2B) to classify the current story data according to a cycle time prediction and apply a label to the current story data that reflects the cycle time prediction. Finally, in a third phase of the method 200 (i.e., steps 240-242 of FIG. 2C), modules of the server computing device 106 conduct a remediation process to identify root causes or deficiencies in the data associated with the current stories that may be associated with the cycle time prediction and generate an alert message to be displayed on the client computing device 102 in proximity to the corresponding data so that such deficiencies can be understood and fixed.

Beginning the training process in FIG. 2A, the vector generation module 108 captures (202) historical data for each of a plurality of completed stories in the Agile development tracking system 114. For example, the vector generation module 108 can retrieve a corpus of historical story data from the tracking system database 116—where each historical story is considered finished in the Agile development process (and thus has an actual cycle time associated with it). Each historical story includes a plurality of different features or characteristics, including items such as: project name, project identifier (e.g., ID number), team name (e.g., developer team assigned to work on the story), issue identifier, issue type, issue type name, story points (e.g., value indicating level of effort required and/or difficulty), parent issue identifier, reporter, assignee, story summary, story description, and cycle time.

For each story, the vector generation module 108 performs a series of steps to convert the completed story into training data for generation and training of the AI classification model. The vector generation module 108 determines (204) one or more developer-specific features from the plurality of features associated with each completed story. For example, the identity of a particular developer or team of developers that are assigned to work on a story can impact the cycle time (e.g., a developer may be more technically skilled, resulting in a shorter cycle time—or a developer may be less skilled, resulting in a longer cycle time). In some embodiments, the developer-specific features can include team name, story points, reporter, and assignee. The vector generation module 108 converts (206) the developer-specific features associated with the completed story into a first vector. For example, the vector generation module 108 can apply a one-hot encoder to the developer-specific features to generate the first vector. The module 108 can then store the first vector in memory for later use as described below.

The vector generation module 108 then determines (208) a text summary for the completed story and a text description for the completed story from the plurality of items. As an example, a completed story may relate to creation of a table in Apache Hive (e.g., for use in creating business-unit specific views). The summary of the completed story is a short text field that briefly describes the story, while the description of the completed story is a longer text field that can contain more detail about the completed story. Using the above example, the summary can be 'Create HIVE table—All issues—No filter of data' and the description can be 'This is the main base table which will contain ALL data—BU specific views will be built on top of this'. The vector generation module 108 identifies (210) a length (e.g., in characters) and a word count for each of the text summary and the text description. In some embodiments, the vector generation module 108 can preprocess the text summary and text description prior to identifying the length and word count—e.g., by removing spaces, punctuation and/or special characters; filtering out stopwords, and so forth.

Continuing with the above example, the module 108 identifies the following:

| Summary/Description | Length | Word Count |
| --- | --- | --- |
| Create HIVE table - All issues - No filter of data | 50 | 9 |
| This is the main base table which will contain ALL data - BU specific views will be built on top of this | 83 | 21 |

The vector generation module 108 then converts (212) the text summary for the completed story into a second vector and converts (214) the text description for the completed story into a third vector. For each of steps 212-214, the module 108 extracts hidden features from the language used in the text summary and the text description using advanced natural language processing (NLP) algorithmic techniques—such as bag-of-words modeling and term frequency-inverse document frequency (TF-IDF). For example, the module 108 can use a bag-of-words model, where the frequency of each keyword in a set is determined and a weight is assigned to the keyword based upon the frequency.

As a result of the NLP processing described above, the vector generation module 108 can generate a second vector for the text summary and a third vector for the text description that incorporates the length and word count features, as well as the hidden features. An exemplary vector for the text description above is: [5.0, 49, 8, 373, 57, 1, 0, 0, 0, 0, 0, 0, 0].

Once the vector generation module 108 has created the first vector, the second vector, and the third vector for a completed story as described above, the module 108 combines (216) each of these vectors into a combined vector for the story.

Now that the vector generation module 108 has produced a combined vector for the completed story, the module 108 assigns (218) a label to the combined vector based upon the cycle time associated with the completed story. The label generally corresponds to the cycle time, in that the module 108 in some embodiments assigns a label of 'high' to combined vectors whose stories had a cycle time of greater than a predetermined threshold (e.g., 20 days), and the module 108 assigns a label of 'normal' to combined vectors whose stories had a cycle time of less than the threshold. It should be appreciated that the module 108 can be configured to assign any number of different labels to the vectors based upon different thresholds for the cycle time. At this point, the vector generation module 108 has built the training data set (i.e., the combined vectors and assigned labels) for generating and training the classification model.

The AI training module 110 receives the training data set from the vector generation module 108 and trains (220) the classification model (generally, a multi-layered neural network) using the combined vectors and assigned labels for the completed stories. In a preferred embodiment, the AI training module 110 uses a Support Vector Machine (SVM) algorithm, which is a supervised machine learning algorithm which can be used in either classification or regression. Generally, in SVM each data item is plotted as a point in a multidimensional space (e.g., n-dimensional, based upon the number of features) with the value of each feature as the value of a particular coordinate in the space. Classification is performed by finding the hyperplane(s) that differentiates the points. Because the AI training module 110 uses SVM which is non-linear, a key feature of training of the classification model as described herein is determination of the coefficients of the hyperplane.

For example, in a linear model (e.g., ax+by+cz=h), where x, y, and z are input features, and h is the predicted output, training of the model with a corpus of sample training data results in determination of the weights a, b, and c. However, because SVM is non-linear, the classifier is a hyperplane and as such, the 'weights' are a matrix.

In one example, the SVM algorithm can be represented as follows:

$$y'=f(x)=Wx$$

where y' is the predicted output and f(x) is the classifier. In a hyperplane classifier can be represented as Wx, where W is the weight matrix from x converted to y'. In that case, the predicted output is a weighted summarization with the weight matrix W. In the present implementation, the influence of each story feature on cycle time can be defined by the weight value W, with the weight value being the "root cause score" for each feature. Therefore, it is important to be able to extract the coefficient matrix for the hyperplane.

The AI training module 110 executes the classification model with the training data by using the combined vectors as input to the model and the assigned label as the output. In an implementation written in Python, the AI training module 110 uses the function 'fit( )' from the package 'sci-kit learn' to push the training data into the model and uses the function 'coef_( )' to extract the weight values as follows:

from sklearn import linear_model, svm
clf=svm.SVC(kernel='linear')
clf.fit(X_training,Y_training)
W=clf.coef_
P=np.dot(W,np.diag(inv(np.var(X_training,0))))

Therefore, W is defined as a weight vector for each feature from the story. Each element in W (e.g., W(i)) should be divided by a variance for each feature (e.g., S(i)) to determine the weight vector—as follows:

$$P(i) = \frac{W(i)}{S(i)}$$

where P(i) is the i-th element of P, S(i) is the variance of the i-th feature.

Therefore:
X=[[0.1,0.1], [0.2,0.1], [0.3,0.2], [0.1,0.2], [0.8,0.3], [0.9, 0.9], [0.8,0.4], [0.5,0.9], [0.5,0.7]]
Y=[0, 0, 0, 0, 0, 1, 1, 1, 1]

According to the classification model, the weight vector W is [0.9345, 1.6823] and the corresponding root cause score is 10.78 for feature 1 and 17.6969 for feature 2.

The result of the training phase (steps 202-220 in FIG. 2A) is a trained classification model that can then be used to provide a prediction of cycle time for newly-created stories in the Agile development tracking system 114. After the AI training module 110 trains the classification model as described above, the module 110 makes the trained model available to the story cycle time prediction module 112 of server computing device 106 for use in predicting cycle time. As shown in FIG. 2B, the story cycle time prediction module 112 performs a prediction process (steps 222-238) on current story data retrieved from database 114 to determine whether a newly-created story may exceed a certain cycle time threshold and if so, to determine which characteristics or features of the story are the root cause of a cycle time issue.

It should be appreciated that steps 222-236 of FIG. 2B are similar to steps 202-216 of FIG. 2A and the details provided above with respect to the data capture, analysis and processing of the historical story data are equally applicable to the data capture, analysis and processing of the current story data described here. The story cycle time prediction module 112 captures (222) current data from each of a plurality of new stories in the Agile development tracking system 114. For example, as developers plan out future software development sprints, they can enter stories for the sprints into the system 114, which stores the stories in database 116. The story cycle time prediction module 112 can automatically detect when one or more new stories are entered into system 114 and capture the data associated with those stories.

For each new story, the story cycle time prediction module 112 performs a series of steps (224-238) to generate a prediction of cycle time for the new story. As mentioned above, these steps are similar to the steps described above with respect to FIG. 2A and the historical data. First, the module 112 determines (224) one or more developer-specific features from the plurality of features associated with the new story (e.g., team name, story points, reporter, and assignee) and convert (226) the developer-specific features associated with the new story into a fourth vector.

The story cycle time prediction module 112 determines (228) a text summary and a text description for the new story from the plurality of features, and identifies (230) a length and a word count for each of the text summary and the text description for the new story. The module 112 converts (232) the text summary for the new story into a fifth vector, and converts (234) the text description for the new story into a sixth vector. The story cycle time prediction module 112 combines (236) the fourth vector, the fifth vector, the sixth vector, the length for the new story and the word count for the new story into a combined vector for the new story.

Then, the story cycle time prediction module 112 executes (238) the trained classification model received from the AI training module 110 using the combined vector for the new story as input to generate a cycle time prediction for the new story. For example, based upon the specific features for the new story as represented in the combined vector, the classification model produces an output that corresponds to a predicted cycle time for the new story. The output can be a label (e.g., 'normal', 'high') that indicates whether the new story is expected to have an anomalous cycle time. As mentioned above, a prediction of 'high' may correspond to a cycle time that is above a predefined threshold (e.g., 20 hours).

Once the story cycle time prediction module 112 has generated a prediction for each new story, the module 112 can determine which stories are predicted to have a 'high' cycle time and analyze the features associated with each new story to identify deficiencies that could be the root cause of the high cycle time. Turning to FIG. 2C, the module 112 performs a remediation process (steps 240-242) to immediately isolate specific stories that could contribute to significant cycle time issues and determine the root cause of such cycle time issues. In addition, in some embodiments, the module 112 can (i) alert the developers via the Agile development tracking system 114 and provide the likely cause of the cycle time anomaly and (ii) automatically change the story as entered in the tracking system 114 to ameliorate the predicted cycle time issues.

The story cycle time prediction module 112 identifies (240) one or more deficiencies in the plurality of features for the new story, based upon the cycle time prediction generated by the trained classification model. For example, the module 112 determines that a newly-entered story has a predicted cycle time of 'high'—indicating that it may take longer than expected to complete and could impact the development timeline. The module 112 analyzes the feature set associated with the newly-entered story and sees that the text description associated with the story has a length of zero and a word count of zero—suggesting that the description is blank. The story cycle time prediction module 112 can be configured with a set of rules generated from the historical story data. As an example, historical stories with blank descriptions may generally have very high cycle times—because the developer assigned to work on the story could not quickly and efficiently understand what was expected as work product or deliverable for the story. Therefore, for new stories, the module 112 can determine that the blank description is the root cause of the high cycle time prediction and flag that feature as a deficiency.

Figure 3:
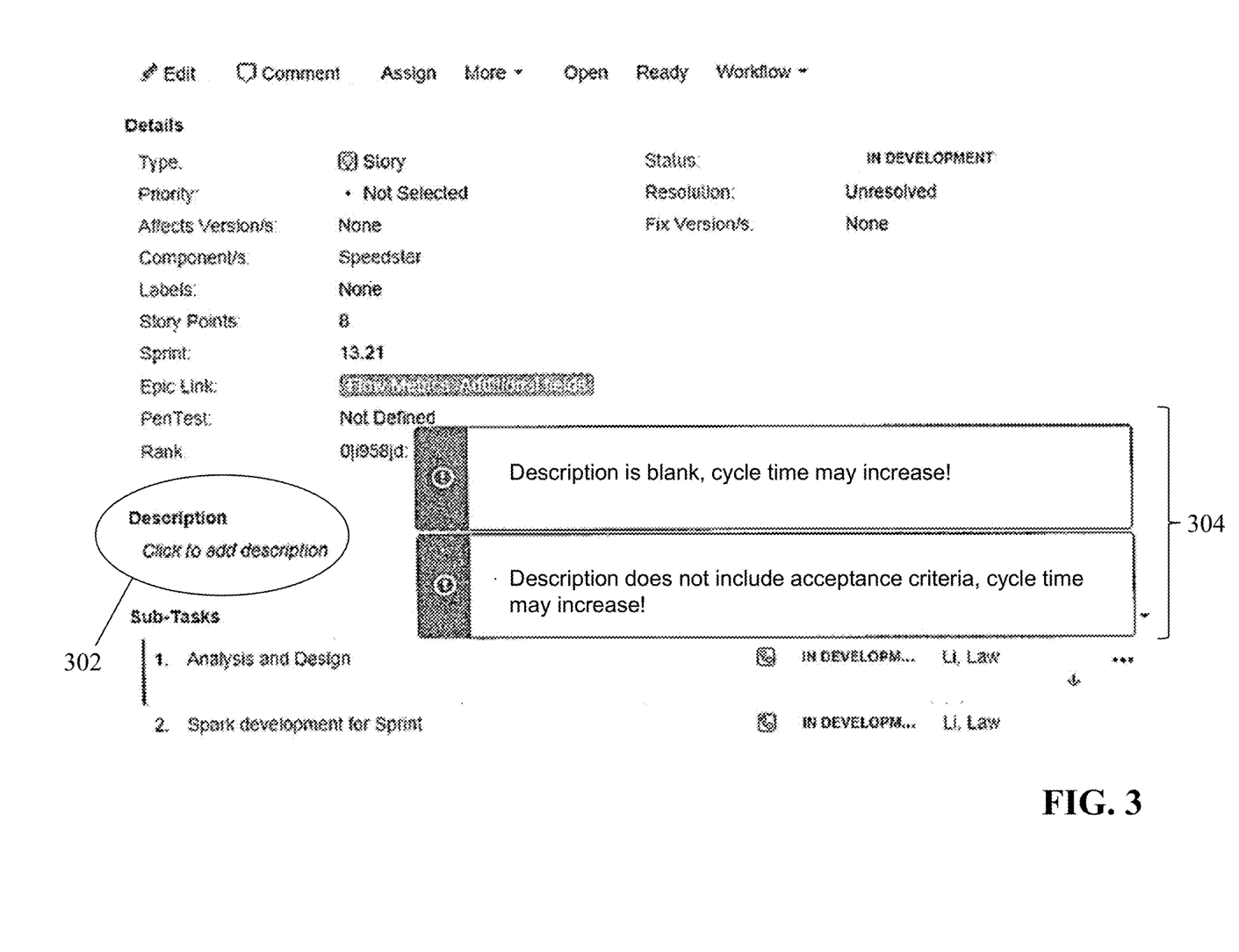
FIG. 3 is a screenshot of an exemplary user interface for displaying the alert messages generated by the story cycle time prediction module.

The story cycle time prediction module 112 generates (242) an alert message to be displayed in a user interface on client computing device 102, where the alert message comprises the identified deficiencies arranged in the user interface in proximity to the corresponding feature(s) for each new story. FIG. 3 is a screenshot of an exemplary user interface for displaying the alert messages generated by the story cycle time prediction module 112. As shown in FIG. 3, the story details are displayed in the upper portion of the user interface and the description 302 is shown in the lower left portion of the screen. However, the description for this story is blank (i.e., 'click to add description'). The module 112 identifies this deficiency and generates two alert messages 304 that appear next to the description field—indicating that the description is not completed, which could result in longer cycle time, and that the description does not include acceptance criteria which also could result in longer cycle time.

In addition to the alert messages, the story cycle time prediction module 112 can be configured to automatically adjust the newly-entered story to remediate the cycle time issue. For example, the module 112 can determine that the description is blank and insert a description into the description field based upon one or more of the other features of the story—such as the software modules associated with the story, a development and/or design document attached to the story, and so forth. In this way, the module 112 advantageously fixes the potential cycle time issue before the story is finalized and entered into the development timeline, which results in increased development efficiency and productivity.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for story cycle time anomaly root cause identification and prediction in an Agile development environment, the system comprising:
a server computing device comprising a memory that stores computer-executable instructions and a processor that executes the computer-executable instructions to:
capture historical data for each of a plurality of completed stories in an Agile development tracking system, the historical data including a plurality of features associated with the completed story;
for each completed story:
determine one or more developer-specific features from the plurality of features associated with the completed story;
convert the developer-specific features associated with the completed story into a first vector;
determine a text summary for the completed story and a text description for the completed story from the plurality of features;
identify a length and a word count for each of the text summary and the text description for the completed story;
convert the text summary for the completed story into a second vector;
convert the text description for the completed story into a third vector;
combine the first vector, the second vector, the third vector, the length for the completed story, and the word count for the completed story into a combined vector for the completed story; and
assign a label to the combined vector for the completed story, the label based upon a cycle time associated with the completed story;
train, using an artificial intelligence neural network executing on the server computing device, a classification model using the combined vectors and the labels for the completed stories;
capture current data for each of a plurality of new stories in the Agile development tracking system, the current data including a plurality of features associated with the new story;
for each new story:
determine one or more developer-specific features from the plurality of features associated with the new story;
convert the developer-specific features associated with the new story into a fourth vector;
determine a text summary for the new story and a text description for the new story from the plurality of features;
identify a length and a word count for each of the text summary and the text description for the new story;
convert the text summary for the new story into a fifth vector;
convert the text description for the new story into a sixth vector; and
combine the fourth vector, the fifth vector, the sixth vector, the length for the new story, and the word count for the new story into a combined vector for the new story;
execute the trained classification model using the combined vector for each new story as input to generate a cycle time prediction for the new story;

based upon the cycle time prediction generated by the classification model, identify one or more deficiencies in the plurality of features for the new story; and generate an alert message to be displayed in a user interface on a client computing device, the alert message comprising the identified deficiencies arranged in the user interface in proximity to the corresponding features for each new story.

2. The system of claim 1, wherein the plurality of features associated with the completed story comprise project name, project ID, team name, issue ID, issue type, issue type name, story points, size estimate, parent issue ID, reporter, assignee, summary, description, and cycle time.

3. The system of claim 2, wherein cycle time comprises an amount of time needed to complete the story.

4. The system of claim 2, wherein the developer-specific features comprise team name, story points, reporter, and assignee.

5. The system of claim 1, wherein the developer-specific features are converted into the first vector using a one-hot encoder.

6. The system of claim 1, wherein the text summary for the completed story is converted into the second vector using one or more of: a bag-of-words model or a term frequency-inverse document frequency (TF-IDF) technique.

7. The system of claim 1, wherein the text description for the completed story is converted into the third vector using one or more of: a bag-of-words model or a term frequency-inverse document frequency (TF-IDF) technique.

8. The system of claim 1, wherein the label assigned to the combined vector for the completed story indicates a high cycle time when the cycle time for the completed story is above a predetermined threshold.

9. The system of claim 1, wherein the label assigned to the combined vector for the completed story indicates a normal cycle time when the cycle time for the completed story is at or below a predetermined threshold.

10. The system of claim 1, wherein the plurality of features associated with the new story comprise project name, project ID, team name, issue ID, issue type, issue type name, story points, size estimate, parent issue ID, reporter, assignee, summary, description, and cycle time.

11. The system of claim 1, wherein the developer-specific features are converted into the fourth vector using a one-hot encoder.

12. The system of claim 1, wherein the text summary for the new story is converted into the fifth vector using one or more of: a bag-of-words model or a term frequency-inverse document frequency (TF-IDF) technique.

13. The system of claim 1, wherein the text description for the new story is converted into the sixth vector using one or more of: a bag-of-words model or a term frequency-inverse document frequency (TF-IDF) technique.

14. The system of claim 1, wherein the one or more deficiencies comprise data errors in the plurality of features.

15. A computerized method of story cycle time anomaly root cause identification and prediction in an Agile development environment, the method comprising:

capturing, by a server computing device, historical data for each of a plurality of completed stories in an Agile development tracking system, the historical data including a plurality of features associated with the completed story;

for each completed story:
determining, by the server computing device, one or more developer-specific features from the plurality of features associated with the completed story;

converting, by the server computing device, the developer-specific features associated with the completed story into a first vector;

determining, by the server computing device, a text summary for the completed story and a text description for the completed story from the plurality of features;

identifying, by the server computing device, a length and a word count for each of the text summary and the text description for the completed story;

converting, by the server computing device the text summary for the completed story into a second vector;

converting, by the server computing device, the text description for the completed story into a third vector;

combining, by the server computing device, the first vector, the second vector, the third vector, the length for the completed story, and the word count for the completed story into a combined vector for the completed story; and assigning, by the server computing device, a label to the combined vector for the completed story, the label based upon a cycle time associated with the completed story;

training, using an artificial intelligence neural network executing on the server computing device, a classification model using the combined vectors and the labels for the completed stories;

capturing, by the server computing device, current data for each of a plurality of new stories in the Agile development tracking system, the current data including a plurality of features associated with the new story;

for each new story:
determining, by the server computing device, one or more developer-specific features from the plurality of features associated with the new story;

converting, by the server computing device, the developer-specific features associated with the new story into a fourth vector;

determining, by the server computing device, a text summary for the new story and a text description for the new story from the plurality of features;

identifying, by the server computing device, a length and a word count for each of the text summary and the text description for the new story;

converting, by the server computing device, the text summary for the new story into a fifth vector;

converting, by the server computing device, the text description for the new story into a sixth vector; and combining, by the server computing device, the fourth vector, the fifth vector, the sixth vector, the length for the new story, and the word count for the new story into a combined vector for the new story;

executing, by the server computing device, the classification model using the combined vector for each new story as input to generate a cycle time prediction for the new story;

based upon the cycle time prediction generated by the classification model, identifying, by the server computing device, one or more deficiencies in the plurality of features for each new story; and generating, by the server computing device, an alert message to be displayed in a user interface on a client computing device, the alert message comprising the identified deficiencies arranged in the user interface in proximity to the corresponding features for each new story.

16. The method of claim 15, wherein the plurality of features associated with the completed story comprise project name, project ID, team name, issue ID, issue type, issue type name, story points, size estimate, parent issue ID, reporter, assignee, summary, description, and cycle time.

17. The method of claim 16, wherein cycle time comprises an amount of time needed to complete the story.

18. The method of claim 16, wherein the developer-specific features comprise team name, story points, reporter, and assignee.

19. The method of claim 15, wherein the developer-specific features are converted into the first vector using a one-hot encoder.

20. The method of claim 15, wherein the text summary for the completed story is converted into the second vector using one or more of: a bag-of-words model or a term frequency-inverse document frequency (TF-IDF) technique.

21. The method of claim 15, wherein the text description for the completed story is converted into the third vector using one or more of: a bag-of-words model or a term frequency-inverse document frequency (TF-IDF) technique.

22. The method of claim 15, wherein the label assigned to the combined vector for the completed story indicates a high cycle time when the cycle time for the completed story is above a predetermined threshold.

23. The method of claim 15, wherein the label assigned to the combined vector for the completed story indicates a normal cycle time when the cycle time for the completed story is at or below a predetermined threshold.

24. The method of claim 15, wherein the plurality of features associated with the new story comprise project name, project ID, team name, issue ID, issue type, issue type name, story points, size estimate, parent issue ID, reporter, assignee, summary, description, and cycle time.

25. The method of claim 15, wherein the developer-specific features are converted into the fourth vector using a one-hot encoder.

26. The method of claim 15, wherein the text summary for the new story is converted into the fifth vector using one or more of: a bag-of-words model or a term frequency-inverse document frequency (TF-IDF) technique.

27. The method of claim 15, wherein the text description for the new story is converted into the sixth vector using one or more of: a bag-of-words model or a term frequency-inverse document frequency (TF-IDF) technique.

28. The method of claim 15, wherein the one or more deficiencies comprise data errors in the plurality of features.

* * * * *